United States Patent
Dassonville et al.

(10) Patent No.: US 6,515,711 B1
(45) Date of Patent: Feb. 4, 2003

(54) SYSTEM FOR CORRECTING AN AURAL CARRIER SIGNAL

(75) Inventors: David Simon Dassonville, Cambridge (GB); Robert J. Plonka, Quincy, IL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/085,711

(22) Filed: May 27, 1998

(51) Int. Cl.7 ............................. H04N 7/08; H04N 5/44; H04N 5/46
(52) U.S. Cl. ...................... 348/607; 348/512; 348/738; 348/737
(58) Field of Search ................................ 348/484, 485, 348/486, 736, 737, 738, 725, 729, 607, 21, 512, 515; 455/108, 116, 119; H04N 7/08, 5/44, 5/46, 5/60

(56) References Cited

U.S. PATENT DOCUMENTS

| | | | |
|---|---|---|---|
| 4,234,963 A | * 11/1980 | Hongu et al. | 455/204 |
| 4,553,162 A | * 11/1985 | Peel | 358/144 |
| 4,571,622 A | * 2/1986 | Davidov et al. | 358/198 |
| 4,591,915 A | * 5/1986 | Davidov et al. | 358/198 |
| 5,029,003 A | * 7/1991 | Jonnalagadda | 348/473 |
| 5,198,904 A | 3/1993 | Ta et al. | 348/738 |
| 5,239,419 A | * 8/1993 | Jarick | 348/473 |
| 5,418,578 A | 5/1995 | Culling | 348/738 |
| 5,909,253 A | * 6/1999 | Jonnalagadda et al. | 348/473 |
| 5,982,446 A | * 11/1999 | Millard | 348/484 |
| 6,081,599 A | * 6/2000 | Zinevitch | 380/210 |

OTHER PUBLICATIONS

"Aural/Visual Multiplex Operation of Klystron Type UHF Television Transmitters" A Report in Engineering Science by Ronald W. Zborowski, The Pennsylvania State University, The Graduate School Radnor Graduate Center.

* cited by examiner

Primary Examiner—John Miller
Assistant Examiner—Brian Yenke
(74) Attorney, Agent, or Firm—Tarolli, Sundheim, Covell, Tummino & Szabo L.L.P.

(57) ABSTRACT

An aural carrier signal is corrected in a common amplifier system wherein the correction serves to reduce cross-modulation distortion of the aural carrier signal caused by non-linearities of the common amplifier system. An aural corrector receives a modulated visual carrier signal comprised of a visual carrier signal modulated by a video baseband signal and a phase corrected aural carrier signal and provides therefrom a combined corrected aural carrier signal. The visual carrier signal is combined with the combined corrected aural carrier signal to provide a corrected output carrier signal.

52 Claims, 3 Drawing Sheets

SYSTEM FOR CORRECTING AN AURAL CARRIER SIGNAL

FIELD OF THE INVENTION

This invention relates to the art of correctors for use in common amplification transmitters wherein aural and visual signals are commonly amplified.

BACKGROUND OF THE INVENTION

It is known to provide common amplification in television transmitters wherein the visual and aural carriers are commonly amplified. The U.S. Pat. to Ta, et al. No. 5,198,904 noted that a problem resulting from such common amplification is aural carrier distortion. The distortion occurs in both the phase and amplitude domains of the aural carrier. This is sometimes referred to as "vision to aural crosstalk" distortion and is caused by the transfer of modulation from a vision carrier to an aural carrier in a combined amplifier. This is primarily due to the non-linear characteristic of the power amplifier used in the transmitter.

The patent to Ta proposes to correct the unwanted distortion of the aural carrier by predistorting phase and amplitude components of the aural carrier so as to be directly opposite to the unwanted distortions caused by the common amplification in a television transmitter. To this end, Ta samples the baseband video signal prior to the signal being used to modulate a visual IF carrier signal. The sampled baseband video signal is delayed by a video delay to compensate for the delays that are introduced in an IF vision modulator to which the baseband video signal is also supplied for modulating a visual carrier signal. The delayed baseband video signal is then applied to a complementary nonlinear amplifier which provides a phase correction signal and an amplitude correction signal. These correction signals are supplied to an amplitude and phase modulator which also receives the aural carrier. The aural carrier is modulated by the amplitude and phase correction signals to provide a modified aural signal which is summed with the output of the IF vision modulator.

The U.S. Pat. to D. Culling No. 5,418,578 is also directed to correcting an aural carrier signal in a common amplifier system. The Culling patent discloses a system wherein the correcting serves to minimize cross-modulation distortion of the aural carrier signal caused by common amplification of aural and visual frequency signals. The correcting apparatus in Culling provides circuitry for receiving a modulated visual signal comprised of a visual carrier signal modulated by a video baseband signal and providing therefrom a detected video signal. The detected video signal is received by an aural corrector which provides therefrom a phase correction signal and an amplitude correction signal. These signals are supplied to phase and amplitude modulation circuitry for modulating an aural carrier with the phase and amplitude correction signals to provide a corrected aural signal which is opposite the cross-modulation distortion. The visual signal and the corrected aural signal are then combined.

It is to be noted that the Ta patent and the Culling patent provide both a phase correction signal and an amplitude correction signal which are then used to phase and amplitude modulate the aural carrier to provide a corrected aural carrier.

Another aural correction system is described in a paper entitled "Aural/Visual Multiplex Operation of Klystron Type UHF Television Transmitters", The Pennsylvania State University Graduate School, report in Engineering Science by Ronald W. Zborowski, March 1981. The Zborowski paper discloses (in FIG. 12) an aural corrector which performs phase correction to eliminate phase modulation of an aural carrier but does not perform amplitude correction and does not include an amplitude modulator for amplitude modulating the aural signal with an amplitude correction signal as in the Ta and Culling patents noted above. Also, the Zborowski paper does not provide a second aural corrector for receiving a modulated visual carrier signal and a phase corrected aural carrier signal to provide therefrom a combined corrected aural carrier signal which is then combined with the visual carrier signal to provide an output signal.

SUMMARY OF THE INVENTION

It is an object of the present invention to provide an aural correction system which does not employ generation of an amplitude correction signal and does not employ an amplitude modulator for modulating the aural carrier with the amplitude correction signal.

In accordance with one aspect of the present invention, apparatus is provided for correcting an aural carrier signal in a common amplifier system wherein the correcting serves to reduce cross-modulation distortion of the aural carrier signal caused by non-linearities of the common amplifier system. An aural corrector receives a modulated visual carrier signal comprised of a visual carrier signal modulated by a video baseband signal and a phase corrected aural carrier signal and provides therefrom a combined corrected aural carrier signal. The modulated visual carrier signal is combined with the combined corrected aural carrier signal in such a manner to provide a corrected output signal.

Another aspect of the present invention provides an aural corrector for reducing or removing vision to aural crosstalk in a combined amplifier, which corrector includes apparatus for providing an original IF vision signal and an IF aural signal. The IF aural signal and an IF vision signal in phase with the original IF vision signal are combined. Also, the IF aural signal and an IF vision signal which is out of phase with the original IF vision signal are combined. A first non-linear circuit introduces non-linear characteristics to the combined in phase IF vision signal and IF aural signal such that the non-linear characteristics of the combined in phase IF vision signal and IF aural signal are the inverse of the non-linear characteristics of the combined vision and aural signal at the output of the amplifier. A second non-linear circuit introduces non-linear characteristics to the combined out of phase IF vision signal and IF aural signal such that the non-linear characteristics of the combined out of phase IF vision signal and IF aural signal are the inverse of the non-linear characteristics of the combined vision and aural signal at the output of the amplifier. A combiner serves to combine the corrected combined in phase IF vision signal and IF aural signal with the corrected combined out of phase IF vision signal and IF aural signal to produce a corrected IF aural signal such that when the original IF vision signal and the corrected IF aural signal are commonly amplified, any vision signal modulated onto the aural signal is substantially reduced.

In accordance with another aspect of the present invention, the aural correcting apparatus includes circuitry for receiving a modulated visual carrier signal comprised of a visual carrier signal modulated by a video baseband signal and providing therefrom a sampled video signal. A first aural corrector receives the sampled video signal and provides therefrom a phase correction signal. A phase modulator receives the aural carrier signal and this signal is modulated with the phase correction signal to provide a phase corrected aural carrier signal. The second aural corrector receives the modulated visual carrier signal and the phase corrected aural carrier signal and provides therefrom a combined corrected aural carrier signal. The visual carrier signal and the combined corrected aural carrier signal are then combined to provide an output signal.

BRIEF DESCRIPTION OF THE DRAWINGS

The foregoing and other objects and advantages of the invention will become more readily apparent from the following description as taken in conjunction with the accompanying drawings, wherein.

DESCRIPTION OF THE PREFERRED EMBODIMENT

Figure 1:
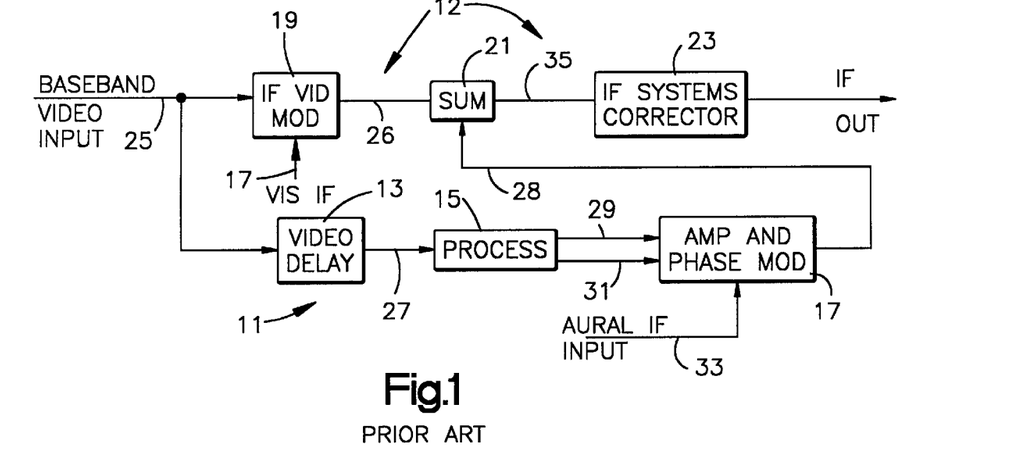
FIG. 1 is a schematic-block diagram illustration of a prior art aural corrector to be described herein.

Before describing the preferred embodiment of the invention herein, reference is first made to FIG. 1 which illustrates a prior art aural carrier correction circuit based on that shown in the U.S. Pat. to Ta et al. No. 5,198,904. The character references shown in FIG. 1 herein correspond to those employed in FIG. 1 of the Ta et al. patent.

As shown in FIG. 1, there is provided an aural carrier correction system 11 in conjunction with a television transmitter, partly shown at 12. The transmitter includes an IF vision modulator 19 followed by a summing circuit 21 and an IF system corrector 23. The system 11 includes a video delay 13, a processor 15 and an amplitude and phase modulator 17. The IF vision modulator receives a baseband video input signal 25 which is used to modulate a visual IF carrier signal 17 to provide an IF visual signal 26. The IF visual signal 26 is summed with a modified IF aural signal 28 at the summing circuit 21 and the combined signal 35 is then supplied to an IF system corrector 23. The baseband video signal 25 is also used as a sample point to supply a sampled baseband video signal to the aural corrector system 11. System 11 includes a complementary amplifier which uses the sampled baseband video signal to provide an amplitude correction signal 29 and a phase correction signal 31. These signals amplitude and phase modulate the aural carrier in the modulator circuit 17 which supplies a modified IF aural signal 28 to the summer 21. Since the baseband video signal 25 is delayed by the IF vision modulator 19, a similar delay is provided by the video delay circuit 13 in the aural corrector system 11 so that there is approximate coincidence between the modified IF aural signal 28 and the visual signal 26 outputted by the IF vision modulator 19. These two signals 26 and 28 are summed by the summer 21 and supplied to the IF system corrector circuit 23.

Figure 2:
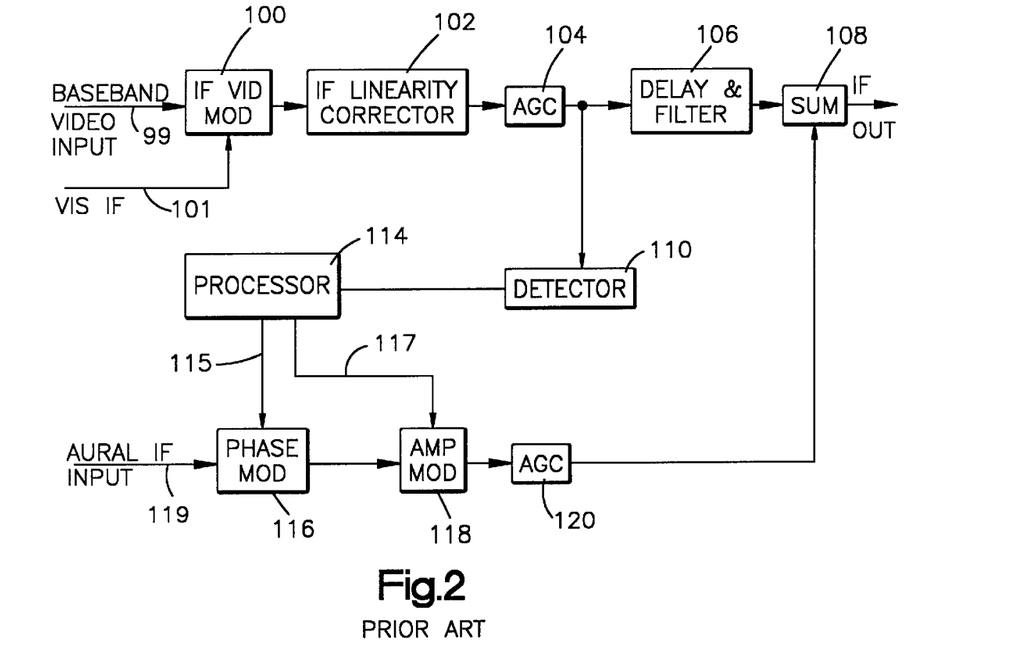
FIG. 2 is a schematic-block diagram illustration of a second prior art aural corrector to be described herein.

Reference is now made to FIG. 2 which illustrates a prior art aural carrier correction circuit based on that shown in the U.S. Pat. to Culling No. 5,418,578. A baseband video input signal 99 is supplied to an IF vision modulator 100 which also receives a visual IF carrier signal 101. The modulated visual signal is then precorrected for distortions introduced in the power amplifier in a conventional IF linearity corrector circuit 102 with the corrected visual signal being supplied to an automatic gain control circuit 104. The automatic gain control (AGC) circuit 104 provides a constant amplitude visual signal used in the aural signal correction circuit to be described below. The visual signal obtained from the automatic gain control circuit (AGC) 104 is supplied to a filter and delay circuit 106, the purpose of which is to equalize the processing time in processor 114, the output of which is supplied to a summing circuit 108. The visual signal from the automatic gain control circuit 104 is demodulated or detected by a detector 110 with the detected signal then being supplied to a processor 114 which provides both a phase correction signal 115 and an amplitude correction signal 117.

The aural IF carrier input signal 119 is applied to a phase modulator 116 and then to an amplitude modulator 118 where the aural carrier is modulated by the phase correction signal 115 and the amplitude correction signal 117 with the output being supplied to an automatic gain control (AGC) 120. The precorrected or modified carrier signal is then supplied to the summing circuit 108 with the output thereof, as in the case of the circuit of FIG. 1, being commonly amplified and transmitted.

Figure 3:
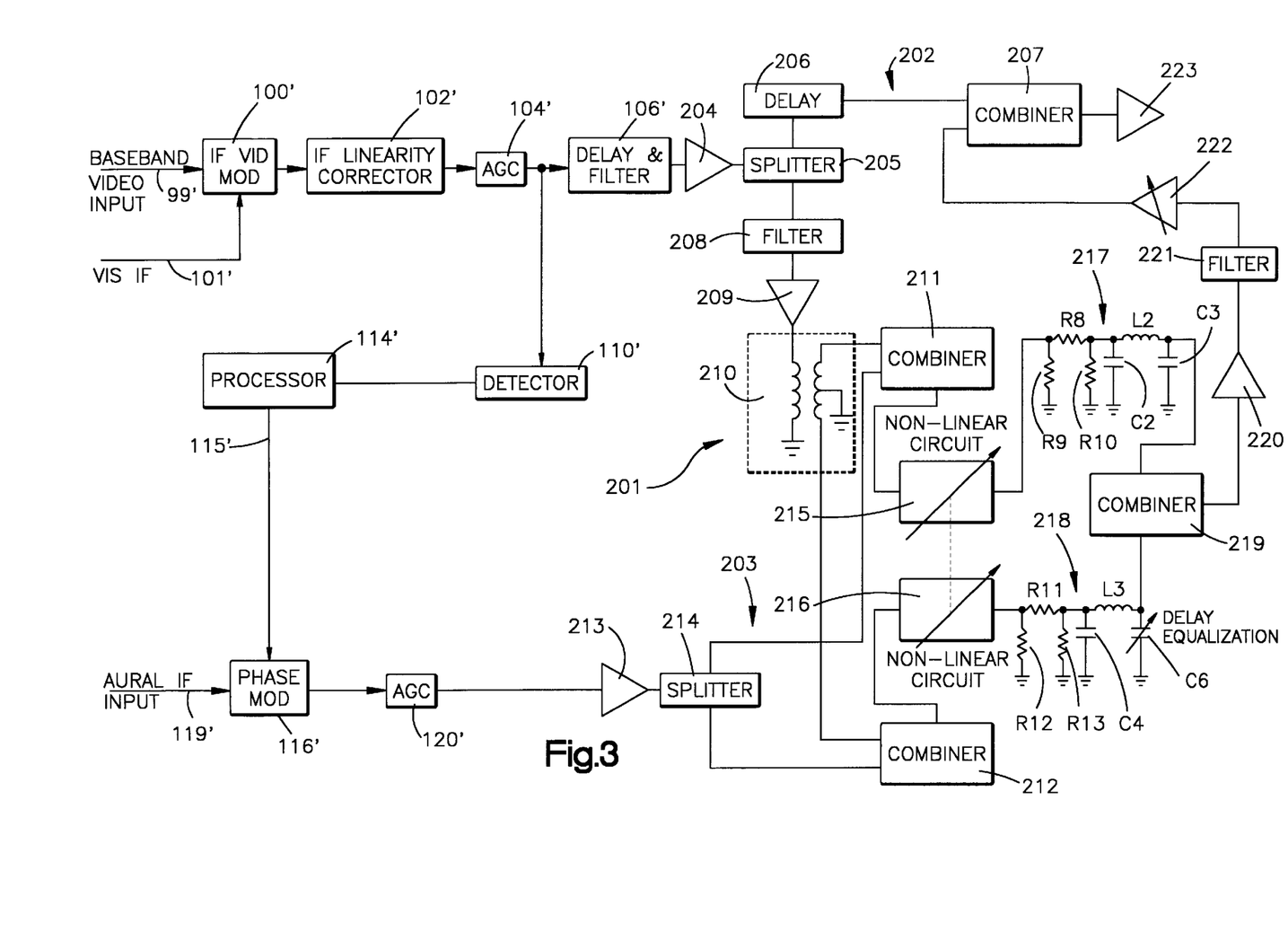
FIG. 3 is a schematic-block diagram illustration of an embodiment of the invention herein.

Reference is now made to FIG. 3. Portions of the circuitry of FIG. 3 are similar to that of FIG. 2 and to simplify the description herein similar elements in FIG. 3 are described with similar character references but using a prime indication. As for example, the IF vision modulator 100' in FIG. 3 corresponds with the IF vision modulator 100 in FIG. 2.

It is to be particularly noted that FIG. 3 does not include an amplitude modulator such as modulator 118 in FIG. 2 or an amplitude correction signal such as signal 117 in FIG. 2. FIG. 3 does include an aural corrector which receives a detected video signal from detector 110' with the detected signal being at the baseband frequency. The detected signal is supplied to the processor 114', which does not generate an amplitude correction signal. Instead, processor 114' provides only a phase correction signal 115' to phase modulator 116'. The aural IF input signal 119' is phase modulated at the phase modulator 116' by the phase correction signal 115'. The output from the phase modulator 116' is a phase corrected aural IF signal which is then applied through an automatic gain control circuit 120' to a second aural corrector circuit to be described below.

Reference is now made to the right hand portion of FIG. 3 which illustrates a second aural corrector that receives the modulated visual carrier signal from the delay and filter circuit 106' as well as the phase corrected aural carrier signal from the automatic gain control circuit 120' and provides from these signals a combined corrected aural carrier signal. The combined corrected aural carrier signal is combined with a delayed modulated visual carrier signal and is then suitably amplified by an amplifier to provide an output signal. The second aural corrector circuit is described in greater detail below.

Referring to FIG. 3, an aural corrector 201 embodying the present invention comprises a vision branch 202 and an aural branch 203. The vision branch 202 is fed with a vision IF signal which passes through a buffer amplifier 204 to an in-phase signal splitter 205. One part of the split vision IF signal is then fed to a delay circuit 206 and thence to an in-phase signal combiner 207. The other part of the vision IF signal is passed through a chrominance filter 208. The vision signal comprises two main tones—a luminance signal (L) which for NTSC is centered at 45.75 MHz, and a chrominance signal (C) which is at approximately 42.17 MHz. The aural IF signal (A) is at 41.25 MHz. The chrominance filter 208 removes the chrominance tone from the vision signal leaving only the luminance signal at 45.75 MHz.

It is important to remove the chrominance tone which includes the color information on a separate carrier to the luminance tone as, in combination with the aural tone, the chrominance tone produces inter-modulation products at or about the same carrier frequency as the luminance tone. These inter-modulation products distort the luminance tone.

The vision signal then passes through a further buffer amplifier 209 to an anti-phase splitter 210. Two signals are tapped from the output of the splitter 210. The first signal is in-phase with the original vision signal and is passed to an in-phase signal combiner 211. The second signal is 180° out of phase with the original vision signal and is tapped from the splitter 210 to another in-phase signal combiner 212.

The aural IF signal on the aural branch 203 passes through a buffer amplifier 213 and thence to an in-phase signal splitter 214. The first part of the split signal from the signal splitter 214 is fed to the first signal combiner 211 and the second part of the signal from the splitter 214 is fed to the second signal combiner 212.

In this manner, the output of the first combiner 211 comprises the vision IF signal without the chrominance tone in combination with the aural IF signal (i.e. =L+A) and the output of the second combiner 212 comprises a vision signal less the chrominance tone which is out of phase with the original vision signal in combination with the aural signal (i.e. =−L+A).

The outputs from the two combiners 211,212 are each fed to a non-linear circuit 215,216 comprising a corrector. Each of the correctors 215,216 operate on the same principle as known correctors and can be phase correctors, amplitude correctors or both phase and amplitude correctors. In the present example, the correctors only perform amplitude correction.

The correctors 215,216 are adjustable so as to correct each of the combined vision and aural IF signals such that the corrected combined vision and aural IF signal has the inverse of the non-linear characteristics of the combined vision and aural signal at the power amplifier so as to minimize any vision cross modulation when the corrected combined vision and aural signal is amplified. The two correctors have the same adjustment settings and therefor have the same non-linear characteristics.

The corrected signals are fed from the correctors 215,216 through respective delay branches 217,218 comprising a number of resistive, capacitive and inductive elements selected to impart a pre-determined delay on the first branch 217. So that the corrected signals can be re-synchronized, the last capacitive element C6 in the second branch 218 is adjustable so that the delay in the second branch 218 can be selected such that the corrected signals when combined in the combiner 219 downstream of the two branches 217,218 are re-synchronized. The re-combined corrected signal is effectively just an aural signal, the in-phase and out of phase vision signals substantially canceling one another out—except for the non-linearities introduced to the signals by the correctors 215,216. The corrected "aural" signal is then passed through a buffer amplifier 220 to a further filter 221 which removes any residual luminance tone from the aural signal. The corrected aural signal passes through an automatic gain control circuit 222 and thence on to the combiner 207 which also receives the delayed vision IF signal on the vision branch 202.

The delay circuit 206 in the vision branch 202 is chosen to provide a delay such that the synchronization of the vision signal and the corrected aural signal occurs at the combiner 207. The combined vision and aural signal is output from the aural corrector from a buffer amplifier 223.

Pre-correction of the signals for addressing any non-linear characteristics of the power amplifier can be carried out before input to the aural corrector 201 and it is also possible to carry out further pre-correction on the output signal from the aural corrector 201.

The in phase vision IF signal from splitter 210 may be referred to herein as signal +V. The 180 degree phase shifted signal from the splitter may be referred to as signal −V. The aural IF signal from the automatic gain control circuit 120' may be referred to as signal A. The in phase splitter 214 applies signal A to combiners 211 and 212. Consequently, the output of combiner 211 is +V +A. The output of combiner 212 is −V +A.

The non-linear circuits 211 and 215 create products $P_n$ and third order products P3. The third order products are of greater importance herein. Thus, the output of non-linear circuit 211 is:

$$+V+A +P3 \qquad \text{Equation 1}$$

and the output of non-linear circuit 212 is:

$$-V+A+P3 \qquad \text{Equation 2}$$

The non-linear circuits 211 and 212 are matched and their control settings are the same. Consequently, these circuits have similar non-linear transfer characteristics. These transfer characteristics are determined by the position of the control settings, to be discussed hereinafter with reference to FIGS. 4 and 5.

The output of combiner 219 may be referred to as the aural precorrected signal Ap and, during the combination, the +V and −V signals cancel. This leaves:

$$Ap=2A+2P3 \qquad \text{Equation 3}$$

Figure 4:
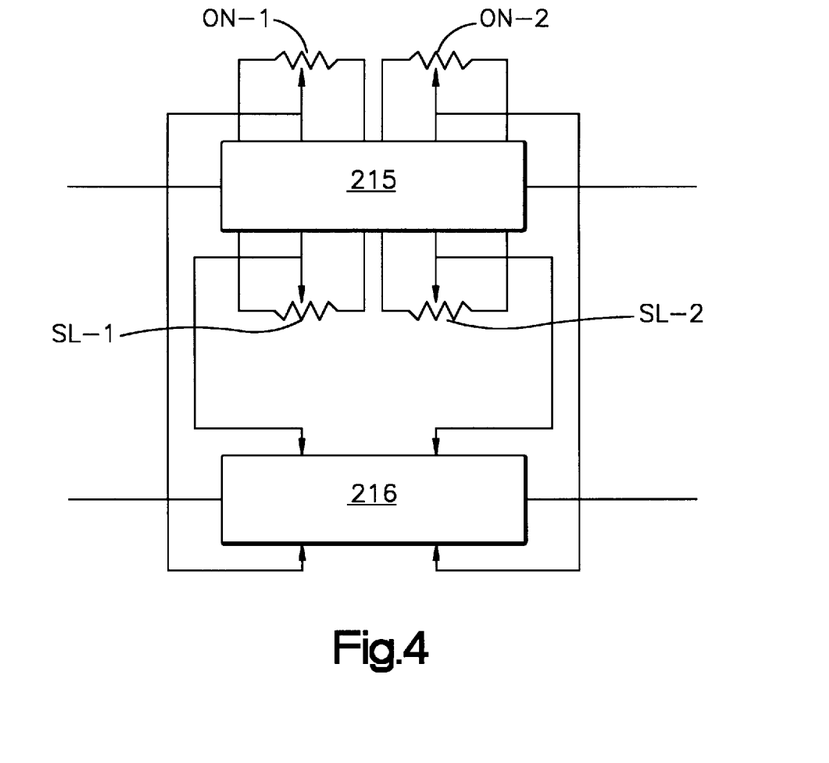
FIG. 4 is a schematic-block diagram illustration of a portion of the circuit shown in FIG. 3.
Figure 5:
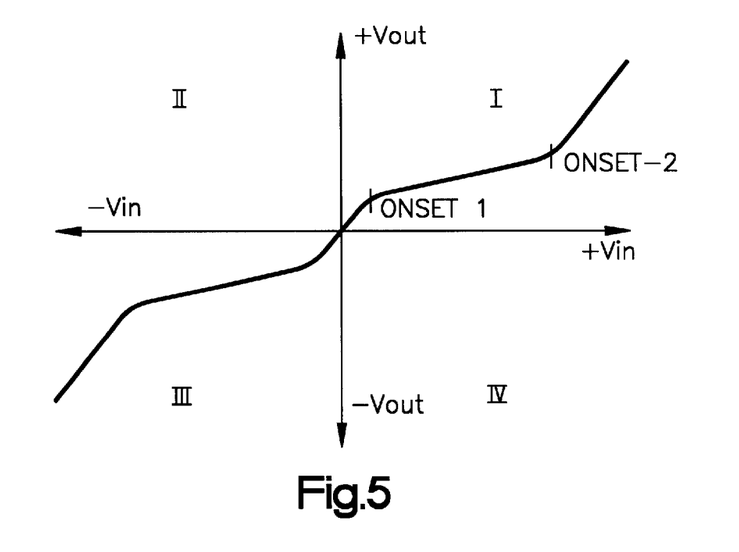
FIG. 5 is a schematic-block illustration of input voltage $V_{IN}$ versus output voltage $V_{OUT}$ and which is helpful in the description of the invention herein.

Reference is now made to FIG. 4 which illustrates the relationship between operator adjustable non-linear circuits 215 and 216. Circuits 215 and 216 have identical non-linear transfer characteristics adjustable by an operator. This is represented in FIG. 5 by the curve therein extending through quadrants I and III. Quadrant I has two break points or onset points referred to in the drawings as onset 1 and onset 2. These points are manually adjustable, as is typical in the art. Adjustments are made to the onset points of the non-linear transfer curve with the use of operator adjustable onset potentiometers ON-1 and ON-2. The wiper arms of the potentiometers ON-1 and ON-2 are coupled to both circuits 215 and 216. The amount of curvature or bending of these curves is referred to as slope. The slope at onset point 1 is operator adjusted by manipulating the wiper arm of slope potentiometer SL-1. Similarly the slope at onset point 2 is operator adjusted by manipulating the wiper arm on slope potentiometer SL-2. It is to be understood that if additional break points are desired then additional onset and slope potentiometers will be required.

As well as effectively removing vision to aural crosstalk by pre-correcting the aural signal when combined with respective in-phase and out of phase vision (luminance) signals, the above-mentioned system is extremely advantageous because the resultant corrected aural signal is produced not in response to the baseband video signal but uses the vestigial side band (VSB) video signal as modulated to its intermediate frequency and as filtered to produce the corrected signal. That is to say that the signal which the present invention uses to impart correction for vision to aural crosstalk is the actual signal which causes the crosstalk modulation in the downstream combined amplifier. It should be appreciated that the baseband video signal itself does not cause the vision to aural crosstalk but a modulated and filtered version thereof. Thus, the present invention provides a much truer correction of the aural signal than is provided by known aural and visual correctors.

The setup procedure for the aural corrector 201 illustrated in FIG. 3 contemplates that the procedure is done off line and not during transmission. The corrector is adjusted by manipulating the potentiometers ON-1, ON-2, SL-1 and SL-2 in FIG. 4. In this procedure, an unmodulated aural carrier signal is added to a vision carrier signal which has been modulated by a ramp signal obtained from a video generator. The slope and onset potentiometers (FIG. 4) are adjusted to a null condition (or an OFF condition). The output of the transmitter is observed with a spectrum analyzer tuned to the unmodulated aural carrier (and not to a demodulated aural carrier). The spectrum analyzer is used in the "zero span" mode, so as to observe the aural carrier only. Any AM modulation on the aural carrier will also be visible. Since the aural input to the transmitter is unmodulated, all AM modulation visible on the aural carrier is unwanted distortion. The correction potentiometers (FIG. 4) are adjusted by the operator until the noted distortion is reduced to a minimum or acceptable level. This adjustment of the correction potentiometer is by a trial and error procedure.

From the above description of the invention, those skilled in the art will perceive improvements, changes and modifications. Such improvements, changes and modifications within the skill of the art are intended to be covered by the appended claims.

Having described the invention, it is now claimed:

1. Apparatus for correcting an aural carrier signal in a common amplifier system wherein the correcting serves to reduce cross-modulation distortion of said aural carrier signal caused by non-linearities of said common amplifier system and comprising:
   aural corrector means for receiving a modulated visual carrier signal comprised of a visual carrier signal modulated by a video baseband signal and a phase corrected aural carrier signal and providing therefrom a combined corrected aural carrier signal;
   means for combining said visual carrier signal with said combined corrected aural carrier signal to provide a corrected output carrier signal;
   said aural corrector means includes means for receiving said visual carrier signal and providing therefrom an in-phase visual signal and an out-of-phase visual signal; and
   first combiner means for receiving said in-phase visual signal and said phase corrected aural signal and providing therefrom a first combined signal.

2. Apparatus as set forth in claim 1 including second combiner means for receiving said out-of-phase visual signal and said phase corrected aural signal and providing therefrom a second combined signal.

3. Apparatus as set forth in claim 1 including a first non-linear circuit for introducing non-linear characteristics onto said first combined signal to provide a first non-linear combined signal.

4. Apparatus as set forth in claim 2 including a second non-linear circuit for introducing non-linear characteristics onto said second combined signal to provide a second non-linear combined signal.

5. Apparatus as set forth in claim 2 including a first non-linear circuit for introducing non-linear characteristics onto said first combined signal to provide a first non-linear combined signal, and a second non-linear circuit for introducing non-linear characteristics onto said second combined signal to provide a second non-linear combined signal.

6. Apparatus as set forth in claim 5 including means for combining said first and second non-linear combined signals to provide therefrom a third combined signal.

7. Apparatus as set forth in claim 6 including means for combining said visual carrier signal with said third combined signal.

8. An aural corrector for reducing vision to aural crosstalk in a combined amplifier, which corrector comprises:
   means to provide an original IF vision signal and an IF aural signal;
   means to combine the IF aural signal and an IF vision signal in phase with the original IF vision signal;
   means to combine the IF aural signal and an IF vision signal which is out of phase with the original IF vision signal;
   means to introduce non-linear characteristics to the combined in phase IF vision signal and IF aural signal such that the non-linear characteristics of the combined in phase IF vision signal and IF aural signal are the inverse of the non-linear characteristics of the combined vision and aural signal at the output of the amplifier;
   means to introduce non-linear characteristics to the combined out of phase IF vision signal and IF aural signal such that the non-linear characteristics of the combined out of phase IF vision signal and IF aural signal are the inverse of the non-linear characteristics of the combined vision and aural signal at the output of the amplifier;
   means to combine the corrected combined in phase IF vision signal and IF aural signal with the corrected combined out of phase IF vision signal and IF aural signal to produce a corrected IF aural signal such that when the original IF vision signal and the corrected IF aural signal are commonly amplified, any vision signal modulated onto the aural signal is substantially reduced.

9. An aural corrector as set forth in claim 8 including splitter means for receiving said original IF vision signal and providing therefrom said in-phase IF vision signal and said out-of-phase IF vision signal.

10. An aural corrector as set forth in claim 9 wherein said out-of-phase IF vision signal is 180 degrees out-of-phase with said in-phase IF vision signal.

11. Apparatus for correcting an aural carrier signal in a common amplifier system wherein the correcting serves to reduce cross-modulation distortion of said aural carrier signal caused by said common amplifier system and comprising:
   means for receiving a modulated visual carrier signal comprised of a visual carrier signal modulated by a video baseband signal and providing therefrom a detected video signal;
   first aural corrector means for receiving said detected video signal and providing therefrom a phase correction signal;
   phase modulating means for receiving said aural carrier signal and modulating same with said phase correction signal to provide a phase corrected aural carrier signal;

second aural corrector means for receiving said modulated visual carrier signal and said phase corrected aural carrier signal and providing therefrom a combined corrected aural carrier signal;

means for combining said modulated visual carrier signal with said combined corrected aural carrier signal to provide a corrected output carrier signal;

said second aural corrector means includes means for receiving said modulated visual carrier signal and providing therefrom an in-phase visual signal and an out-of-phase visual signal.

12. Apparatus as set forth in claim 11 including first combiner means for receiving said in-phase visual signal and said phase corrected aural signal and providing therefrom a first combined signal.

13. Apparatus as set forth in claim 12 including a first non-linear circuit for introducing non-linear characteristics onto said first combined signal to provide a first non-linear combined signal.

14. Apparatus as set forth in claim 12 including second combiner means for receiving said out-of-phase visual signal and said phase corrected aural signal and providing therefrom a second combined signal.

15. Apparatus as set forth in claim 14 including a second non-linear circuit for introducing non-linear characteristics onto said second combined signal to provide a second non-linear combined signal.

16. Apparatus as set forth in claim 14 including a first non-linear circuit for introducing non-linear characteristics onto said first combined signal to provide a first non-linear combined signal, and a second non-linear circuit for introducing non-linear characteristics onto said second combined signal to provide a second non-linear combined signal.

17. Apparatus as set forth in claim 16 including means for combining said first and second non-linear combined signals to provide therefrom a third combined signal.

18. Apparatus as set forth in claim 17 including means for combining said visual carrier signal with said third combined signal.

19. A method for reducing crosstalk interference between an aural carrier signal and a visual carrier signal in a common amplifier television transmitter system by modifying the aural carrier signal to be applied to a common amplifier stage, the method comprising the steps of:

receiving a visual carrier signal;

receiving a phase corrected aural carrier signal that was phase corrected by a signal derived by detecting the visual carrier signal;

combining the visual carrier signal and the phase corrected aural carrier signal to provide a combined carrier signal;

introducing amplitude pre-distortion into the combined carrier signal;

removing the visual carrier signal from the combined carrier signal to provide a phase pre-corrected and amplitude pre-distorted aural carrier signal, and combining the phase pre-corrected and amplitude pre-distorted aural carrier signal with the visual carrier signal to provide a combined output carrier signal for amplification by said amplifier.

20. A method as defined in claim 19 wherein:

the combining step includes phase splitting of the visual carrier signal into in-phase and out-of-phase components and separately summing the in and out-of-phase components of the visual carrier signal with the phase pre-corrected aural carrier signal to provide an in-phase summed combined carrier signal and an out-of-phase summed combined carrier signal, and wherein the introducing step includes amplitude pre-distortion into both the in-phase and out-of-phase summed combined carrier signals.

21. A method as defined in claim 20 wherein:

the removing step reduces the presence of the visual carrier signal by summing the pre-distorted in-phase summed combined carrier signal with the pre-distorted out-of-phase summed combined carrier signal.

22. A method as defined in claim 21 wherein:

substantially the same degree of amplitude pre-distortion is introduced in both the in-phase and out-of-phase summed combined carrier signals.

23. A method as defined in claim 22 wherein:

the visual and aural carrier frequencies are at an intermediate frequency.

24. A method as defined in claim 23 wherein the introducing step includes the added steps of:

applying an unmodulated aural carrier to the vision carrier signal modulated with a ramp signal, and observing the unmodulated aural carrier to introduce amplitude pre-distortion in a direction to reduce amplitude distortion therein.

25. A corrector circuit for reducing crosstalk interference between the aural carrier signal and the visual carrier signal in a common amplifier television transmitter system by modifying the aural carrier signal to be applied to a common amplifier stage comprising:

an input circuit for receiving a visual carrier signal;

an input circuit for receiving a phase corrected aural carrier signal which has been phase pre-corrected by a signal derived by detecting the visual carrier signal;

a first combiner connected to receive the visual and aural carrier signals and combining the visual carrier signal and the phase pre-corrected aural carrier signal;

a pre-distortion circuit for introducing amplitude pre-distortion into the combined carrier signal;

circuit means significantly reducing the presence of visual carrier signal included in the amplitude pre-distorted aural carrier signal to provide a phase corrected and amplitude pre-distorted aural carrier signal, and a second combiner for combining the phase pre-corrected and amplitude pre-distorted aural carrier signal with the visual carrier signal to provide a combined output carrier signal for amplification by the amplifier stage.

26. A corrector circuit as defined in claim 25 wherein:

the first combiner includes a phase splitter for splitting the visual carrier signal into in-phase and out-of-phase components and a summer circuit for separately summing the in and out-of-phase components of the visual carrier signal with the phase pre-corrected aural carrier signal to provide an in-phase summed combined carrier signal and an out-of-phase summed combined carrier signal, and the pre-distortion circuit introduces amplitude pre-distortion into both the in-phase and out-of-phase summed combined carrier signals.

27. A corrector circuit as defined in claim 26 wherein:

the circuit means includes a summer circuit that reduces the presence of the visual signal modulation by summing the amplitude pre-distorted in-phase summed combined carrier signal with the amplitude pre-distorted out-of-phase summed combined signal.

28. A corrector circuit as defined in claim 27 wherein:
the pre-distortion circuit introduces substantially the same amplitude pre-distortion in both the in-phase and out-of-phase summed combined carrier signals.

29. A corrector circuit as defined in claim 28 wherein:
the visual and aural carrier frequencies are at an intermediate frequency.

30. A corrector circuit defined in claim 29 including:
circuit means for receiving a vision carrier signal modulated with a ramp signal;
circuit means for receiving an unmodulated aural carrier and applying the signal to the vision carrier signal modulated with a ramp signal, and
circuit means for observing the unmodulated aural carrier for adjusting the pre-distortion circuit in a direction to reduce amplitude distortion therein.

31. A power amplifier stage for a television transmitter comprising:
an input circuit for receiving an aural IF carrier signal to be transmitted;
an input circuit for receiving a visual IF carrier signal to be transmitted;
a phase pre-correction circuit for processing the visual signal to provide a phase correction signal for modulating the aural IF carrier signal to provide a phase pre-corrected aural IF carrier signal;
a first combiner connected to receive the visual IF carrier signal and the phase pre-corrected aural IF carrier signal for combining the signals to provide a combined visual IF carrier signal and phase pre-corrected aural IF carrier signal;
a pre-distortion circuit for introducing amplitude pre-distortion into the combined visual IF carrier signal and phase pre-corrected aural IF carrier signal to provide an amplitude pre-distorted combined carrier signal;
circuit means for reducing the presence of the visual IF carrier signal included in the amplitude pre-distorted combined carrier signal to provide a phase pre-corrected and amplitude pre-distorted aural IF carrier signal; and
a second combiner for combining the phase pre-corrected and amplitude pre-distorted aural IF carrier signal with the visual IF carrier signal to provide a combined output carrier signal.

32. Apparatus for correcting an aural carrier signal in a common amplifier system wherein the correcting serves to reduce cross-modulation distortion of said aural carrier signal caused by non-linearities of said common amplifier system and comprising:
an aural corrector that receives a modulated visual carrier signal comprised of a visual carrier signal modulated by a video baseband signal and a phase corrected aural carrier signal and provides therefrom a combined corrected aural carrier signal;
a combiner that combines said visual carrier signal and said combined corrected aural carrier signal to provide a corrected output carrier signal;
said aural corrector includes a splitter that receives said visual carrier signal and provides therefrom an in-phase visual signal and an out-of-phase visual signal;
a first combiner that receives said in-phase visual signal and said phase corrected aural signal and provides therefrom a first combined signal.

33. Apparatus as set forth in claim 32 including a second combiner that receives said out-of-phase visual signal and said phase corrected aural signal and provides therefrom a second combined signal.

34. Apparatus as set forth in claim 32 including a first non-linear circuit that introduces non-linear characteristics onto said first combined signal to provide a first non-linear combined signal.

35. Apparatus as set forth in claim 33 including a second non-linear circuit that introduces non-linear characteristics onto said second combined signal to provide a second non-linear combined signal.

36. Apparatus as set forth in claim 33 including a first non-linear circuit that introduces non-linear characteristics onto said first combined signal to provide a first non-linear combined signal, and a second non-linear circuit that introduces non-linear characteristics onto said second combined signal to provide a second non-linear combined signal.

37. Apparatus as set forth in claim 36 including a third combiner that combines said first and second non-linear combined signals to provide therefrom a third combined signal.

38. An aural corrector for reducing vision to aural crosstalk in a combined amplifier, which corrector comprises:
a first input circuit providing an original IF vision signal and a second input circuit providing an IF aural signal;
a first combiner that combines the IF aural signal and an IF vision signal in phase with the original IF vision signal;
a second combiner that combines the IF aural signal and an IF vision signal which is out of phase with the original IF vision signal;
a first non-linear circuit that introduces non-linear characteristics to the combined in phase IF vision signal and IF aural signal such that the non-linear characteristics of the combined in phase IF vision signal and IF aural signal are the inverse of the non-linear characteristics of the combined vision and aural signal at the output of the amplifier;
a second non-linear circuit that introduces non-linear characteristics to the combined out of phase IF vision signal and IF aural signal such that the non-linear characteristics of the combined out of phase IF vision signal and IF aural signal are the inverse of the non-linear characteristics of the combined vision and aural signal at the output of the amplifier;
a third combiner that combines the corrected combined in phase IF vision signal and IF aural signal with the corrected combined out of phase IF vision signal and IF aural signal to produce a corrected IF aural signal such that when the original IF vision signal and the corrected IF aural signal are commonly amplified, any vision signal modulated onto the aural signal is substantially reduced.

39. An aural corrector as set forth in claim 38 including a splitter that receives said original IF vision signal and provides therefrom said in-phase IF vision signal and said out-of-phase IF vision signal.

40. An aural corrector as set forth in claim 39 wherein said out-of-phase IF vision signal is 180 degrees out-of-phase with said in-phase IF vision signal.

41. Apparatus for correcting an aural carrier signal in a common amplifier system wherein the correcting serves to reduce cross-modulation distortion of said aural carrier signal caused by said common amplifier system and comprising:
a detector that receives a modulated visual carrier signal comprised of a visual carrier signal modulated by a video baseband signal and providing therefrom a detected video signal;

a first aural corrector that receives said detected video signal and provides therefrom a phase correction signal;

a phase modulator that receives said aural carrier signal and modulates same with said phase correction signal to provide a phase corrected aural carrier signal;

a second aural corrector that receives said modulated visual carrier signal and said phase corrected aural carrier signal and provides therefrom a combined corrected aural carrier signal;

a signal combiner that combines said, modulated visual carrier signal with said combined corrected aural carrier signal to provide a corrected output carrier signal; and said second aural corrector includes a signal splitter that receives said modulated visual carrier signal and provides therefrom an in-phase visual signal and an out-of-phase visual signal.

42. Apparatus as set forth in claim 41 including a first combiner that receives said in-phase visual signal and said phase corrected aural signal and provides therefrom a first combined signal.

43. Apparatus as set forth in claim 41 including a first non-linear circuit that introduces non-linear characteristics onto said first combined signal to provide a first non-linear combined signal.

44. Apparatus as set forth in claim 42 including a second combiner that receives said out-of-phase visual signal and said phase corrected aural signal and provides therefrom a second combined signal.

45. Apparatus as set forth in claim 44 including a second non-linear circuit that introduces non-linear characteristics onto said second combined signal to provide a second non-linear combined signal.

46. Apparatus as set forth in claim 44 including a first non-linear circuit that introduces non-linear characteristics onto said first combined signal to provide a first non-linear combined signal, and a second non-linear circuit that introduces non-linear characteristics onto said second combined signal to provide a second non-linear combined signal.

47. Apparatus as set forth in claim 46 including a third combiner that combines said first and second non-linear combined signals to provide therefrom a third combined signal.

48. A corrector circuit for reducing crosstalk interference between the aural carrier signal and the visual carrier signal in a common amplifier television transmitter system by modifying the aural carrier signal to be applied to a common amplifier stage comprising:

an input circuit that receives a visual carrier signal;

an input circuit that receives a phase corrected aural carrier signal which has been phase pre-corrected by a signal derived by detecting the visual carrier signal;

a first combiner that combines the visual carrier signal and the phase pre-corrected aural carrier signal;

a pre-distortion circuit that introduces amplitude pre-distortion into the combined carrier signal;

a signal corrector that reduces the presence of visual carrier signal included in the amplitude pre-distorted aural carrier signal to provide a phase corrected and amplitude pre-distorted aural carrier signal, and a second combiner that combines the phase pre-corrected and amplitude pre-distorted aural carrier signal with the visual carrier signal to provide a combined output carrier signal for amplification by the amplifier stage.

49. A corrector circuit as defined in claim 48 wherein:

the first combiner includes a phase splitter that splits the visual carrier signal into in-phase and out-of-phase components and a summer circuit for separately summing the in and out-of-phase components of the visual carrier signal with the phase pre-corrected aural carrier signal to provide; an in-phase summed combined carrier signal and an out-of-phase summed combined carrier signal, and the pre-distortion circuit introduces amplitude pre-distortion into both the in-phase and out-of-phase summed combined carrier signals.

50. A corrector circuit as defined in claim 49 wherein:

the signal corrector includes a summer circuit that reduces the presence of the visual signal modulation by summing the amplitude pre-distorted in-phase summed combined carrier signal with the amplitude pre-distorted out-of-phase summed combined signal.

51. A corrector circuit as defined in claim 50 wherein:

the pre-distortion circuit introduces substantially the same amplitude pre-distortion in both the in-phase and out-of-phase summed combined carrier signals.

52. A corrector circuit as defined in claim 51 wherein:

the visual and aural carrier frequencies are at an intermediate frequency.

* * * * *